US008264706B2

(12) United States Patent
Sato

(10) Patent No.: US 8,264,706 B2
(45) Date of Patent: Sep. 11, 2012

(54) IMAGE READING APPARATUS AND METHOD OF READING IMAGE

(75) Inventor: Masato Sato, Tokyo (JP)

(73) Assignee: Oki Data Corporation, Tokyo (JP)

(*) Notice: Subject to any disclaimer, the term of this patent is extended or adjusted under 35 U.S.C. 154(b) by 752 days.

(21) Appl. No.: 12/320,318

(22) Filed: Jan. 23, 2009

(65) Prior Publication Data

US 2009/0190163 A1 Jul. 30, 2009

(30) Foreign Application Priority Data

Jan. 25, 2008 (JP) ................. 2008-014409

(51) Int. Cl.
*G06F 15/00* (2006.01)
*G06F 7/04* (2006.01)
(52) U.S. Cl. .......................... 358/1.14; 726/9
(58) Field of Classification Search ............ 358/1.14, 358/1.15
See application file for complete search history.

(56) References Cited

U.S. PATENT DOCUMENTS
2006/0151607 A1 * 7/2006 Horikiri et al. ............... 235/454

FOREIGN PATENT DOCUMENTS
JP   2002-232630   8/2002

* cited by examiner

*Primary Examiner* — Saeid Ebrahimi DehKordy
(74) *Attorney, Agent, or Firm* — Rabin & Berdo, P.C.

(57) ABSTRACT

An image reading apparatus reads the image of an original document. An original document reading section scans an original document to read the image of an original document. A scanned data producing section produces scanned data based on the image read from the original document. A communication section receives a read command from the external apparatus, the read command containing a first item of identification information and a command to read the image from the original document, and transmits scanned data produced in the scanned data producing section to the external apparatus. A user inputs a second item of identification information through an inputting section. If the first item of identification information and the second item of identification information coincide, then a controller allows the original document reading section to scan the original document.

9 Claims, 16 Drawing Sheets

IMAGE READING APPARATUS AND METHOD OF READING IMAGE

BACKGROUND OF THE INVENTION

1. Field of the Invention

The present invention relates to an image reading apparatus that reads image information from an original document, and more particularly to an image reading apparatus that receives an image reading command from a host apparatus via a network.

2. Description of the Related Art

A conventional image reading system includes an image reading apparatus connected to a network such as a local area network (LAN). The image reading apparatus reads an image form an original document, and transmits the image to a personal computer via the network. If the image data is classified, the image data should be protected from third parties. JP 2002-232630 discloses one such image reading system.

This image reading system is configured such that image data read by an image reading apparatus is stored together with a password in an image processing apparatus. If a host computer transmits a request for the image data together with the same password as that stored in the image processing apparatus, the image processing apparatus transmits the image data to the host computer.

For conventional image reading systems that employ pull-scan technology, a host computer transmits a command to read the image of an original document after the original document is placed in an image reading apparatus. The image data may be stolen by an unauthorized host computer if the a command to read the image of an original document is sent to the image reading apparatus from the unauthorized computer, after the image data has been read from the original document and before a password has been given to the image data by an authorized host computer.

SUMMARY OF THE INVENTION

The present invention was made to solve the aforementioned drawbacks of the conventional apparatuses.

An object to the invention is to provide an image reading apparatus configured in a pull-scan mode in which an unauthorized user is prevents from stealing the image.

An image reading apparatus reads the image of an original document. An original document reading section scans an original document to read the image of an original document. A scanned data producing section produces scanned data based on the image read from the original document. A communication section receives a read command from the external apparatus, the read command containing a first item of identification information and a command to read the image from the original document, and transmits scanned data produced in the scanned data producing section to the external apparatus. A user inputs a second item of identification information through an inputting section. If the first item of identification information and the second item of identification information coincide, then a controller allows the original document reading section to scan the original document.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

First Embodiment

Figure 1:
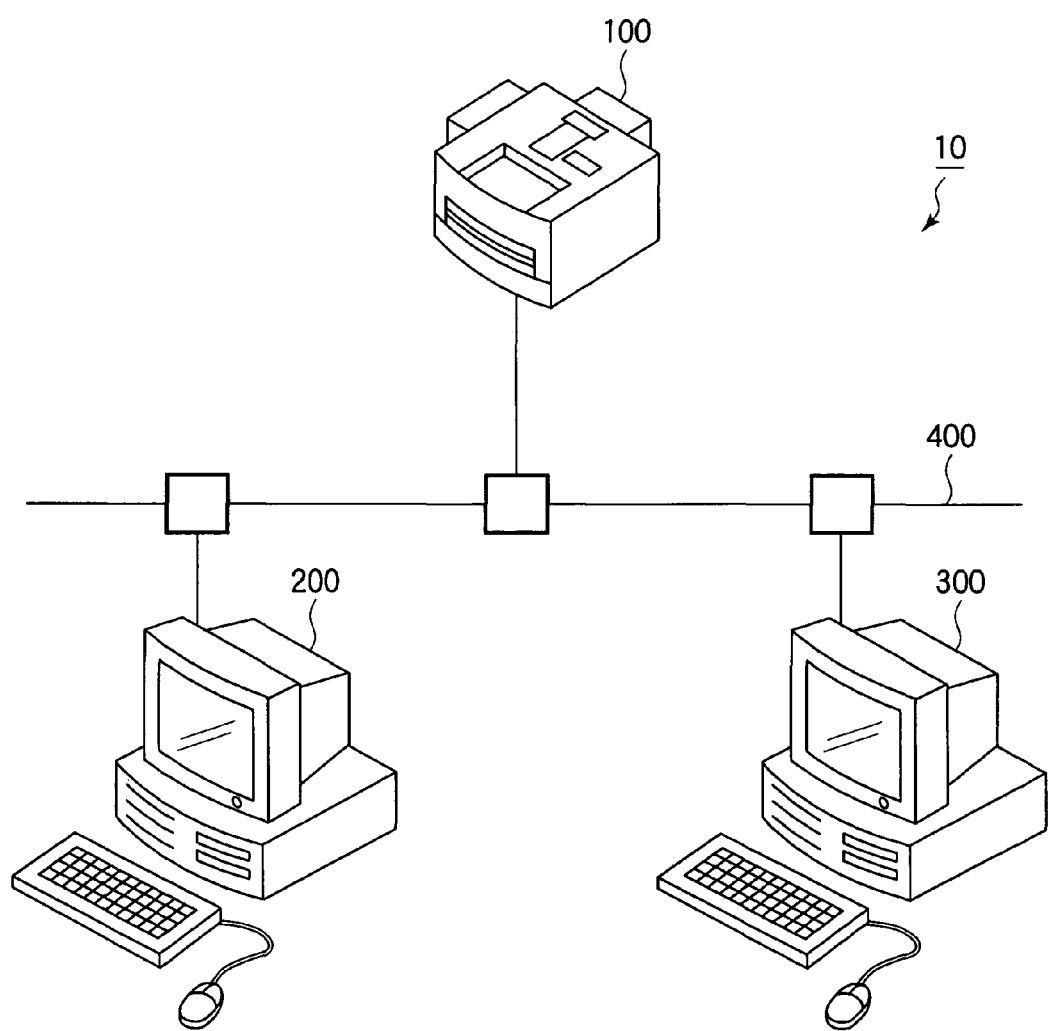
FIG. 1 illustrates the configuration of an image reading system of a first embodiment.
Figure 2:
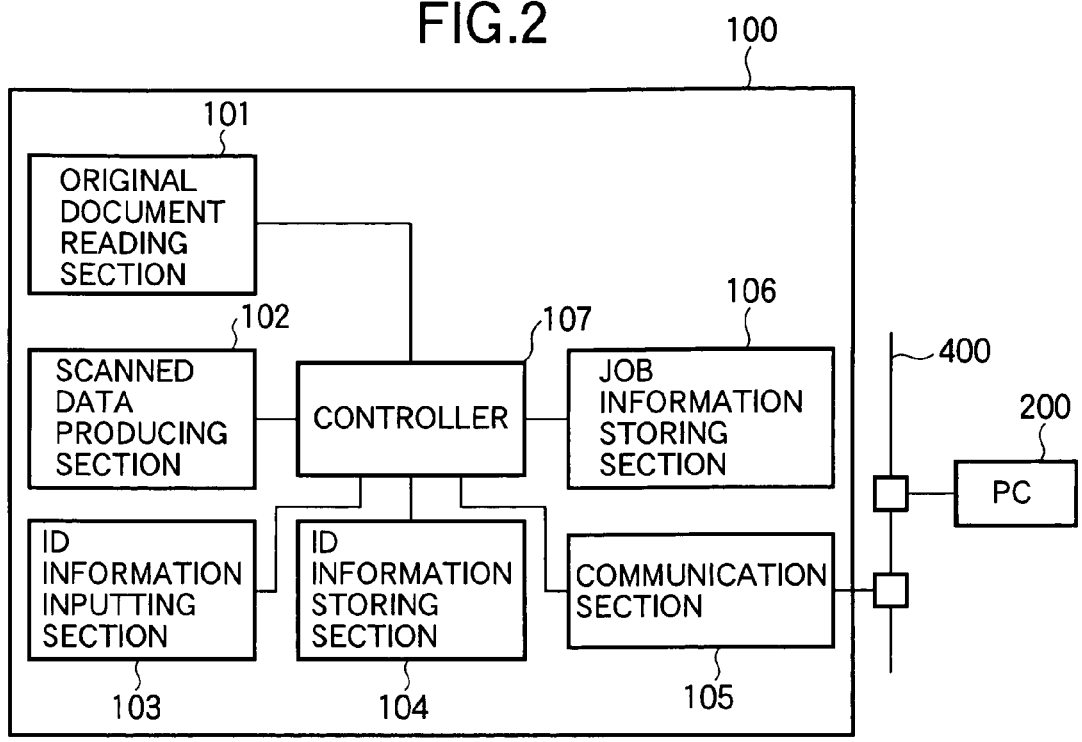
FIG. 2 is a block diagram illustrating the configuration of an image reading apparatus.

Common reference numerals are used to identify common elements throughout the drawings. FIG. 1 illustrates the configuration of an image reading system 10 of a first embodiment. FIG. 2 is a block diagram illustrating the configuration of an image reading apparatus.

Referring to FIG. 1, the image reading system 10 includes an image reading apparatus or a network scanner 100 connected via a LAN 400 to personal computers (PCs) 200 and 300 which are source apparatuses that transmit a read command instructing to read the image of an original document. The network scanner 100 and PCs 200 and 300 are configured to support transmission control protocol/Internet Protocol (TCP/IP). Any number of PCs may be employed.

Referring to FIG. 2, the network scanner 100 includes an original document reading section 101, a scanned data producing section 102, an identification information inputting section (referred to as ID information inputting section hereinafter 103, an identification information storing section (referred to as ID information storing section hereinafter) 104, a communication section 105, a job information storing section 106, and a controller 107. The original document reading section 101 reads the image of an original document, and takes the form of a sheet-feed type reading apparatus including an automatic document feeder (ADF). The original document is fed into original document reading section 101, and is then discharged after reading the image of the original document. If the image of the original document is to be read again, the original document needs to be fed again manually into the original document reading section 101.

The scanned data producing section 102 produces scanned data from the image read by the original document reading section 101. The thus produced scanned data may be in, for example, portable document format (PDF), joint photographic experts group (JPEG), or tag image file format (TIFF). The ID information inputting section 103 reads information stored in, for example, an IC card of a user. Alternatively, the ID information inputting section 103 may be a key board. Authentication information on a user may be in any form as long as authentication may be performed. The authentication information may be, for example, the user's employee number which identifies the user and is usually employed in an environment that involves a network scanner.

The ID information storing section 104 stores authentication information inputted by the user through the ID information inputting section 103. A communication section 105 communicates with the PC 200 and PC 300 over the LAN 400 (FIG. 1). A job information storing section 106 stores information on a job produced by executing an image reading operation and information on the source apparatus that transmits the read command. A controller 107 controls the overall operation of the network scanner 100. The controller 107 is connected via signal lines to the aforementioned respective sections, and controls the respective sections. The controller 107 also controls the network scanner 100 to enter a user log-in mode as well as performs authentication between the authentication information inputted through the ID information inputting section 103 and the authentication information received from the PCs.

Figure 3:
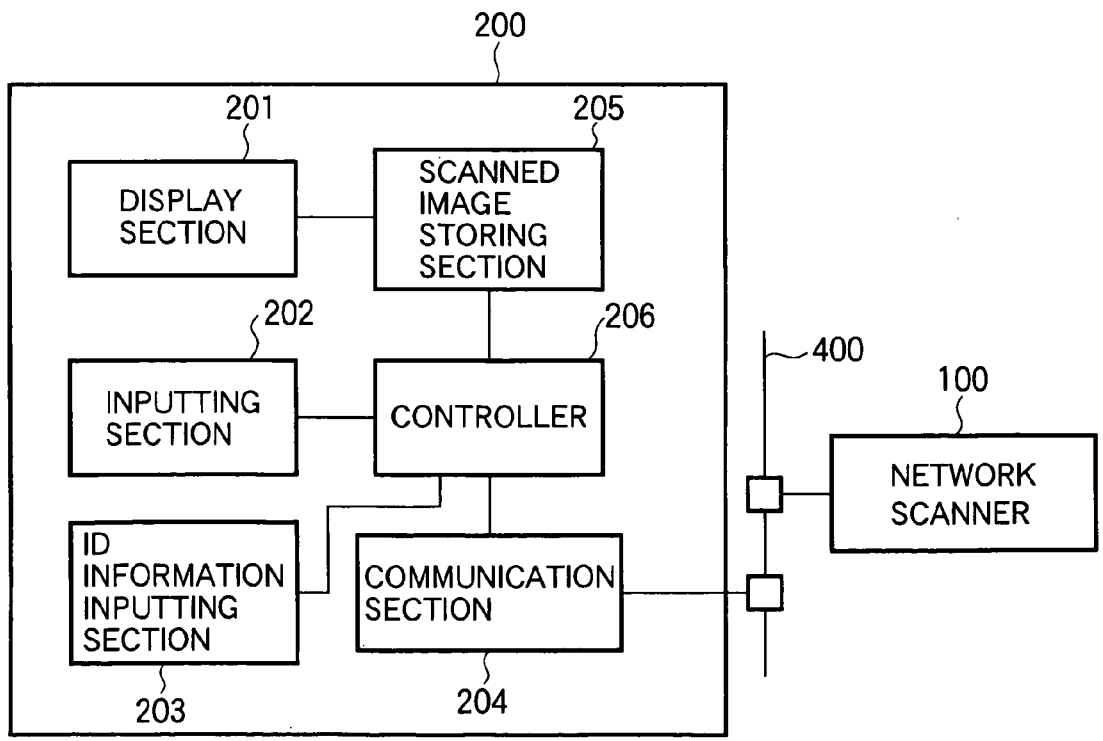
FIG. 3 is a block diagram illustrating the configuration of a personal computer connected to the image reading system.

FIG. 3 is a block diagram illustrating the configuration of the PC 200 connected to the image reading system 10. The PC 200 includes a display section 201, an inputting section 202, an ID information inputting section 203, a communication section 204, a scanned image storing section 205, and a controller 206. The display section 201 displays a screen through which a user selects a scanner of a destination apparatus to which the PC 200 transmits the read command, and a screen through which the user performs various operations for transmitting the read command. The user operates the inputting section 202 for selecting a scanner of the destination apparatus and transmitting the read command. The inputting section 202 may be in the form of a keyboard or a mouse.

The ID information inputting section 203 may be, for example, an IC card reader that reads the information on the user from an IC card. Alternatively, the ID information inputting section 203 may be a keyboard. The authentication information on users may be, for example, employee numbers. The communication section 204 communicates with the network scanner 100 over the LAN 400. The scanned image storing section 205 stores image data received from the network scanner 100 through the communication section 204. The controller 206 is connected to the respective sections via signal lines, thereby controlling the overall operation of the PC 200. The PC 300 is configured in the same way as the PC 200.

Figure 4:
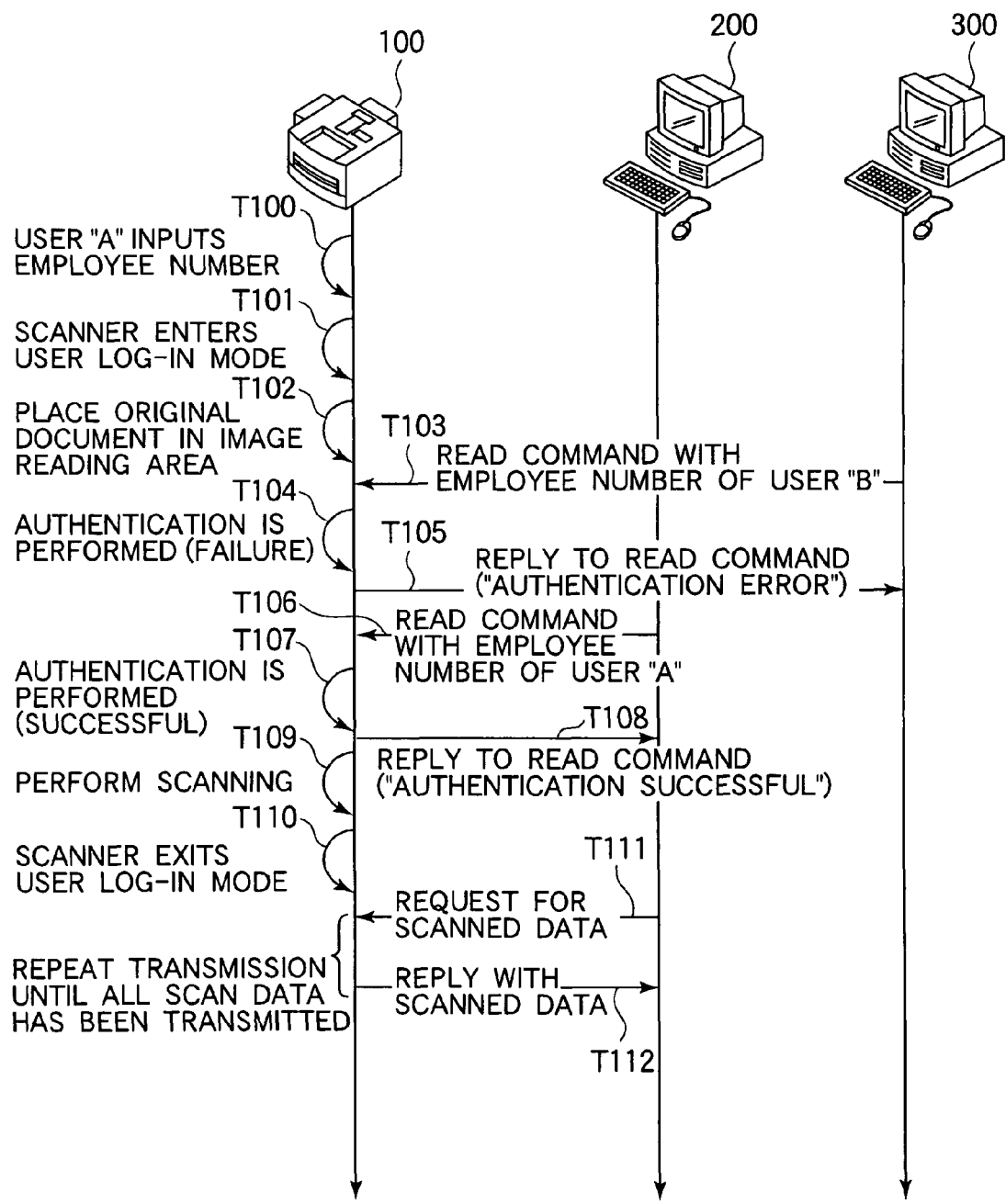
FIG. 4 illustrates the sequence of the overall operation of the first embodiment.

FIG. 4 illustrates the sequence of the overall operation of the first embodiment. The operation of the first embodiment will be described with reference to FIG. 4.

Referring to FIG. 4, the user (e.g., USER A) of the PC 200 inputs authentication information or his employee number through the ID information inputting section 103 using the IC card, prior to placing an original document on the original document reading section 101 of the network scanner 100 (T100). Upon receiving the employee number from the PC, the network scanner 100 enters a user log-in mode (T101). Then, the user places the original document on the original document reading section 101 (T102).

Assume that after the network scanner 100 has entered the user log-in mode, another user (e.g., USER B) of the PC 300 transmits his employee number together with a read command to the communication section 105 of the network scanner 100 (T103). Then, the network scanner 100 performs authentication and determines that the user B is not authorized (T104). The network scanner 100 transmits "AUTHENTICATION ERROR" to the PC 300 through the communication section 105 (T105), thereby not performing reading of the image of the original document in response to an unauthorized user.

Upon receiving the employee number and the read command to read an original document from the USER A of the PC 200 (T106) through the communication section 105, the network scanner 100 performs authentication (T107). Because the USER A is the authorized user, authentication is successful and the network scanner 100 transmits a reply to the PC 200 through the communication section 105, the reply indicating success of authentication (T108).

The network scanner 100 causes the original document reading section 101 to read the image of the original document (T109), and then exits the user log-in mode (T110). Upon receiving the reply indicating success of authentication, the PC 200 transmits a request for obtaining scanned data (T111). In response to the request from the PC 200, the network scanner 100 transmits the scanned image data to the PC 200 through the communication section 105 (T112). The network scanner 100 continues to transmit the image data until all the image data of the original document has been transmitted.

Figure 5:
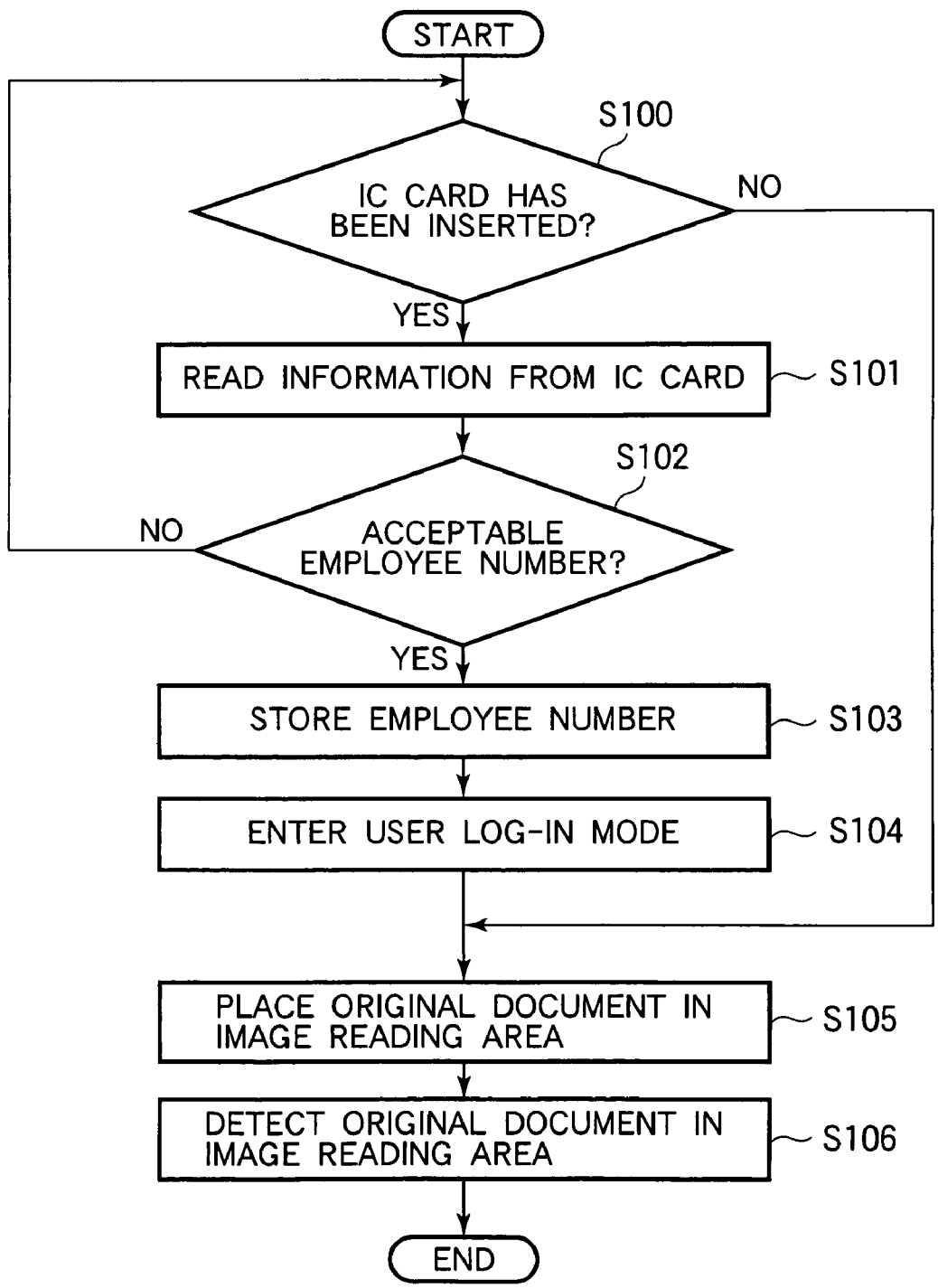
FIG. 5 is a flowchart illustrating the operation of a network scanner when a user places an original document on the network scanner.

FIG. 5 is a flowchart illustrating the operation of the network scanner 100 when the user places the original document on the network scanner 100. The operation of the network scanner 100 will be described with reference to FIG. 5.

Initially, the network scanner 100 is not in the user log-in mode. The user inserts his IC card into the ID information inputting section 103 (i.e., the IC card reader), thereby inputting the user's authentication information (S100). If the original document is not classified, there is no need to input the authentication information, which will be described later. The controller 107 executes the process for reading the information from the IC card inserted into the ID information inputting section 103 (S101).

If the information read from the IC card contains an acceptable employee number of the user (S102), the ID information storing section 104 stores the employee number (S103). The controller 107 controls the network scanner 100 to enter the user log-in mode (S104). Once the network scanner 100 has entered the user log-in mode, the image of the original document is read only when the authentication is successful. If it is determined at step S102 that the employee number is not acceptable, the program jumps back to step S100, and prompts the user to input his employee number again.

If YES at S102, then, the user places the original document on the reading section 101 in position, so that the original document is ready to be read (S105). The controller 107 detects the presence of the original document placed in an image reading area by means of a detecting means (FIG. 16) (S106). This completes the operation of the network scanner 100 when the user places the original document on the network scanner 100. If the user places the original document before he inputs his employee number, the operation of the network scanner 100 aborts the operation, not entering the user log-in mode.

Figure 6:
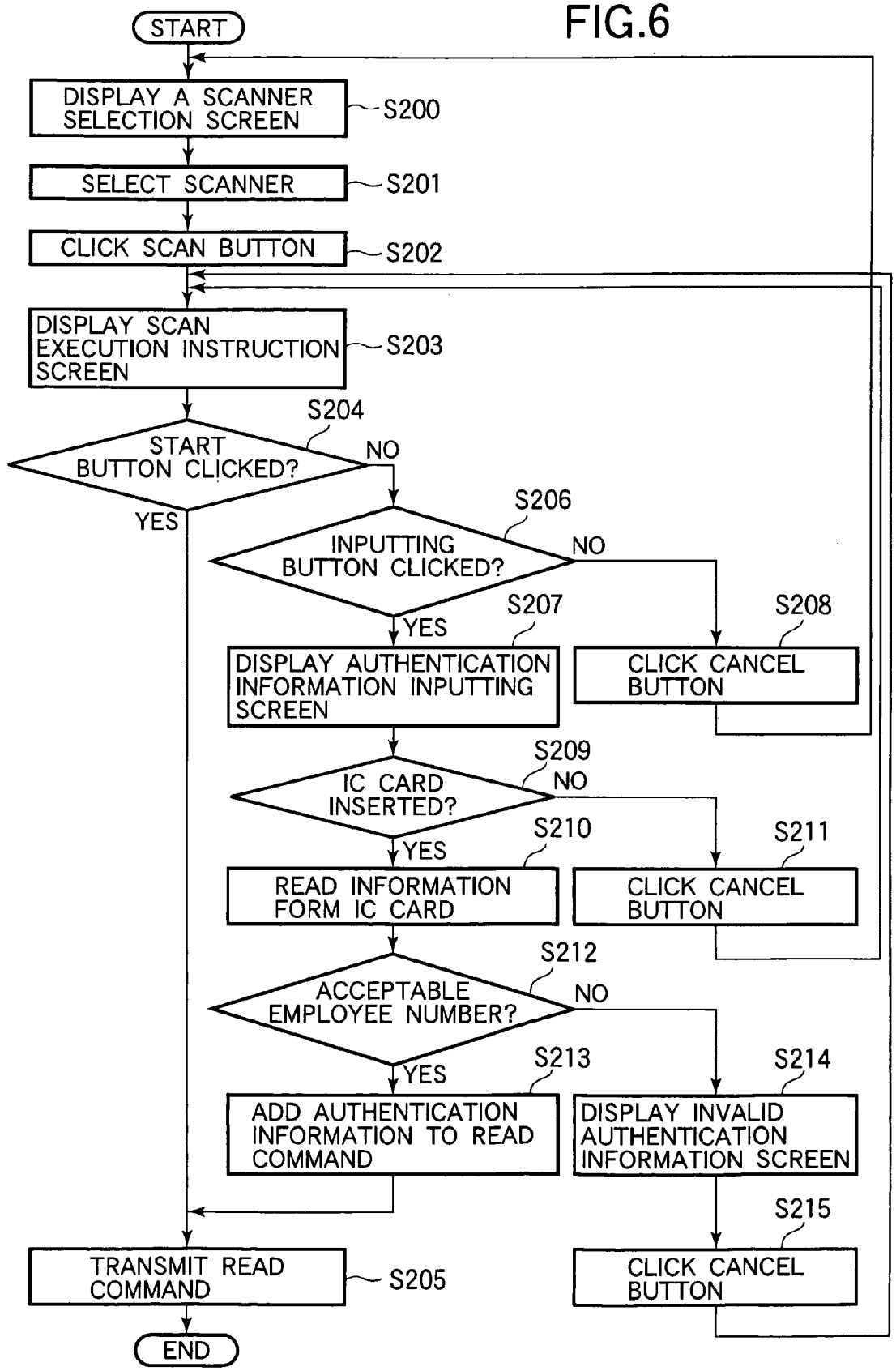
FIG. 6 is a flowchart illustrating the operation of the personal computer when the personal computer transmits a read command.
Figure 7:
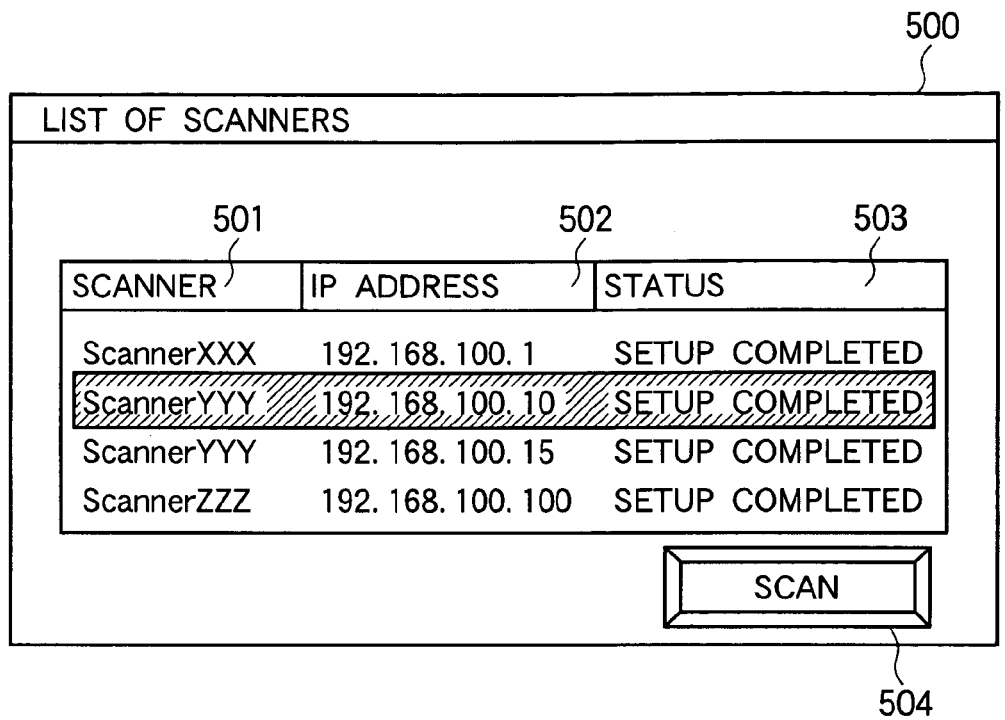
FIG. 7 illustrates a scanner selection screen.

FIG. 6 is a flowchart illustrating the operation of the PC 200 when the PC 200 transmits the read command. FIG. 7 illustrates a scanner selection screen 500. The operation of the PC 200 will be described with reference to FIG. 6 and FIG. 7.

The user operates the inputting section 202, causing the display section 201 to display the scanner selection screen 500 (S200).

Referring to FIG. 7, the scanner selection screen 500 includes a scanner name 501, an IP address 502, a status 503, a scan execution button 504. The scanner name 501 includes model names of scanners from which the user is allowed to select. The IP address 502 displays the IP addresses of the scanners that have previously been registered with the PC 200. The status 503 displays the current statuses of the scanners. The status 503 may include various statuses including "SETUP COMPLETED" indicating that the scanner is ready to read the image of an original document and "NOT CONNECTED" indicating that the scanner has not been turned on yet. For example, a simple network management protocol (SNMP) monitors the statuses of the scanners. The scanners displayed on the scanner selection screen 500 each have a driver for reading the image of an original document.

Figure 8:
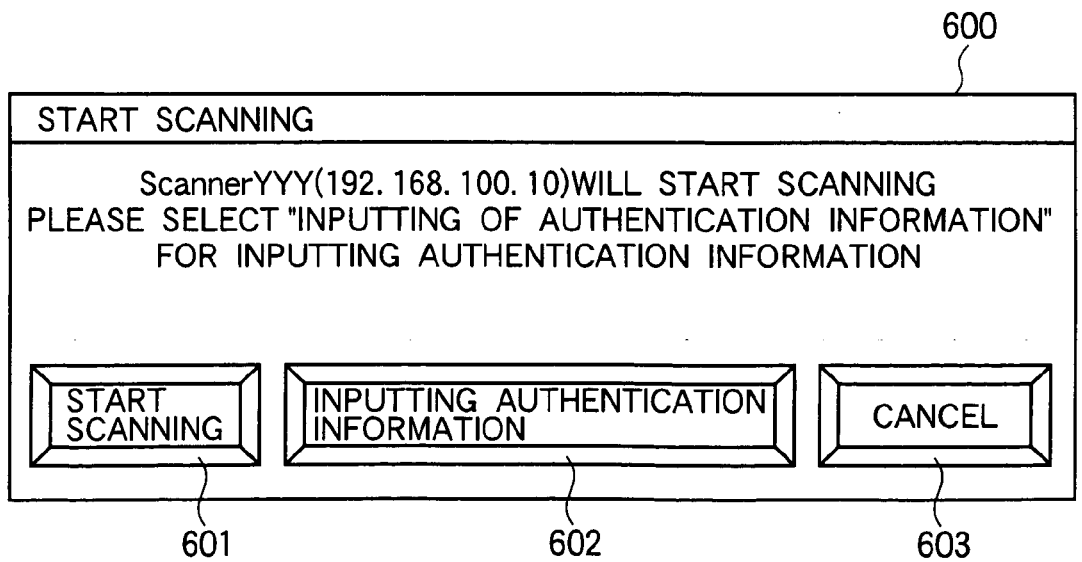
FIG. 8 illustrates a scan execution instruction screen.

The user operates the inputting section 202 to select a desired scanner to which a read command is to be transmitted from the PC 200 (S201). Referring to FIG. 7, the user selects Scanner YYY (IP address: 192. 168. 100. 10). When the user operates the inputting section 202 to click the scan execution button 504 (S202), the display section 201 displays a scan execution instruction screen 600 (S203). FIG. 8 illustrates the scan execution instruction screen 600.

Referring to FIG. 8, the scan execution instruction screen 600 includes a start button 601, an inputting button 602, and a cancel button 603. The start button 601 is used to start reading of the image of the original document without authentication information. The inputting button 602 is used to input the employee number (i.e., authentication information) from the IC card. The cancel button 603 is used to cancel the reading operation by a selected scanner.

If the user A operates the inputting section 202 to click the start button 601 (S204), the PC 200 transmits the read command to the network scanner 100 (S205). If the user A operates the inputting section 202 to click the inputting button 602 (S206), an authentication information inputting screen 700 is displayed (S207). If the user A operates the inputting section 202 to click the cancel button 603 (S208), the program loops back to step S200 to display the scanner selection screen 500.

Figure 9:
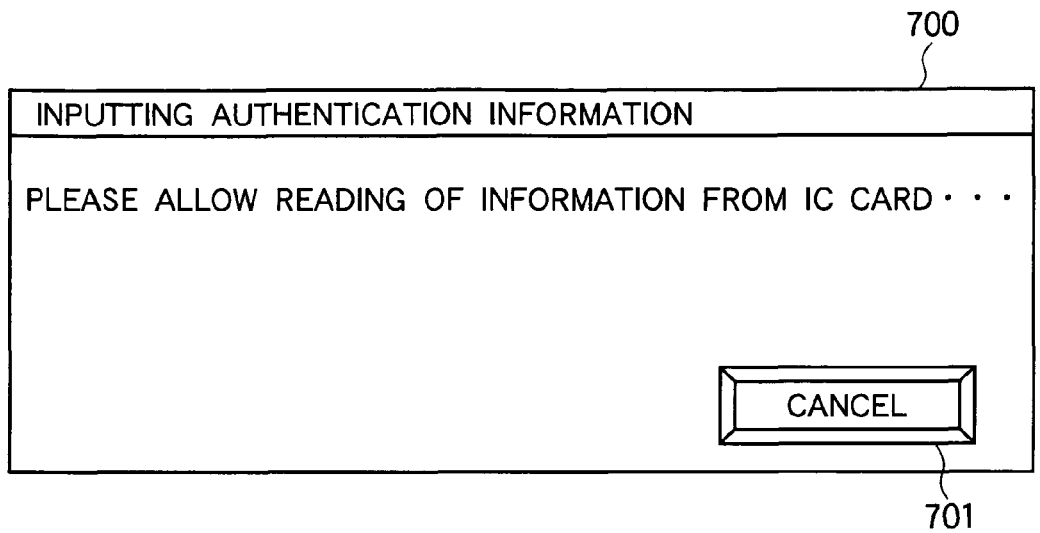
FIG. 9 illustrates an example of an authentication information inputting screen.

FIG. 9 illustrates an example of the authentication information inputting screen 700 displayed at step S207. Referring to FIG. 9, a cancel button 701 is displayed on the authentication information inputting screen 700. When the authentication information inputting screen 700 is being displayed, if the user inserts the IC card into the ID information inputting section 203 (Y at S209), the information is read in from the IC card (S210). If the IC card has not been inserted into the ID information inputting section 203 (N at S209), then the user A operates the inputting section 202 to click the cancel button 603 in the authentication information inputting screen 700 (S211), so that the authentication information inputting screen 700 is closed and the program loops back to S203 to display the scan execution instruction screen 600 again.

If an employee number obtained at step S210 from the IC card is acceptable (Y at S212), the employee number is added to the read command (S213), and is then transmitted to the network scanner 100 through the communication section 204 (S205).

Figure 10:
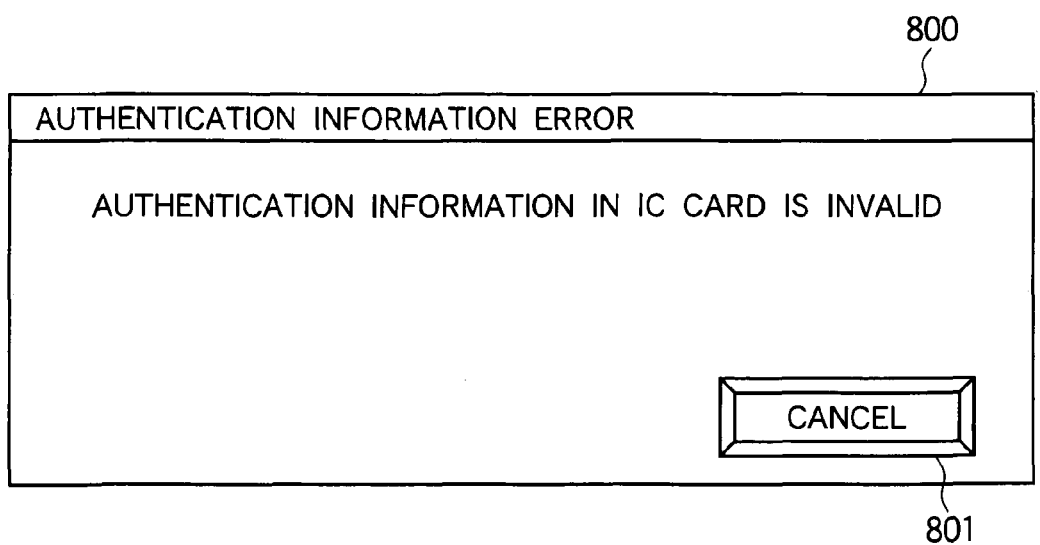
FIG. 10 illustrates an invalid authentication information screen, notifying the user of failure of authentication.

If it is determined that the employee number read in from the IC card at step S210 is not acceptable (N at S212), the network scanner 100 displays an invalid authentication information screen 800 on the display section 201 (S214). FIG. 10 illustrates the invalid authentication information screen 800, notifying the user of failure of authentication. Referring to FIG. 10, the invalid authentication information screen 800 includes a cancel button 801. If the user operates the inputting section 102 to click the cancel button 801 (S215), the invalid authentication information screen 800 is closed, and the program jumps back to S203 where the scan execution instruction screen 600 is displayed.

Figure 11:
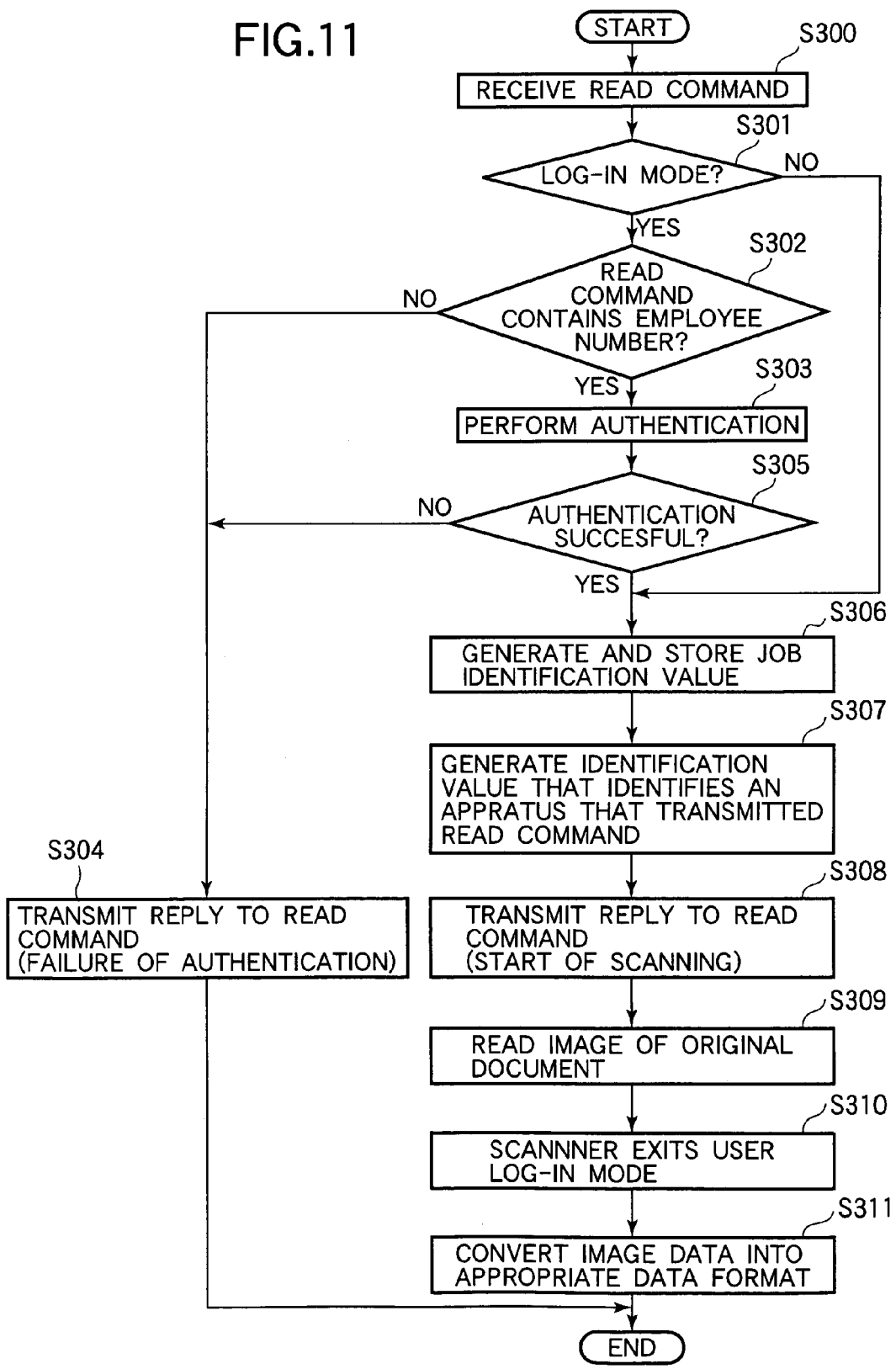
FIG. 11 illustrates the operation of the network scanner when the network scanner receives the read command.

FIG. 11 illustrates the operation of the network scanner 100 when the network scanner 100 receives the read command. The operation of the network scanner 100 will be described with reference to FIG. 11. Upon receiving the read command from the PC 200 through the communication section 105 (S300), the controller 107 makes a decision to determine whether the network scanner 100 has been in the user log-in mode (S301). If the network scanner 100 has been in the user log-in mode (Y at S301), then the controller 107 makes a decision to determine whether the read command contains an employee number (i.e., authentication information) (S302).

If the read command contains an employee number, authentication is performed (S303). The authentication is performed between the employee number contained in the read command and the employee number that was inputted through the inputting section 103 and stored into the ID information storing section 104 when the original document was placed on the original document reading section 101 in position. If the both employee numbers coincide or are equivalent, authentication is successful. If they don't coincide or are not equivalent, authentication fails.

If it is determined at step S302 that the read command does not contain an employee number (N at S302), the network scanner 100 transmits a reply indicative of failure of authentication to the PC 200 through the communication section 105 (S304). Likewise, if the authentication failed (N at step S305), the network scanner 100 transmits a reply indicative of failure of authentication to the PC 200 through the communication section 105 (S304).

If the authentication is successful (Y at S305), a job identification value corresponding to the read command is generated in the network scanner 100, and is stored in the job information storing section 106 (S306). Then, the network scanner 100 produces an identification value that identifies the source apparatus (here PC 200) that transmitted the read command, and a corresponding job identification value generated at S306 are stored in tabular form in the job information storing section 106 (S307).

Then, a reply for notifying the start of the reading of the image is transmitted through the communication section 105 (S308). This reply contains the job identification value generated at S306, and the identification value (produced at S307) that identifies the source apparatus (here PC 200) that transmitted the read command.

Then, the original document reading section 101 reads the image of the original document (S309). When the original document reading section 101 has completed the reading of the original document, the network scanner 100 exits the user log-in mode (S310). If the network scanner 100 is in the manual feed mode (i.e., not in the automatic document feeding (ADF) mode), it cannot be avoided that the original document placed on the image reading section 101 may be read by an unauthorized user. When the image of the original document is read in the ADF mode, the original document is discharged onto a stacker after reading. Thus, even if a read command is transmitted from a PC (e.g., 300) that did not transmit the authentication information, the original document cannot be read. The scanned data producing section 102 converts the image data read by the original document reading section 101 into an appropriate data format (S311).

Figure 12:
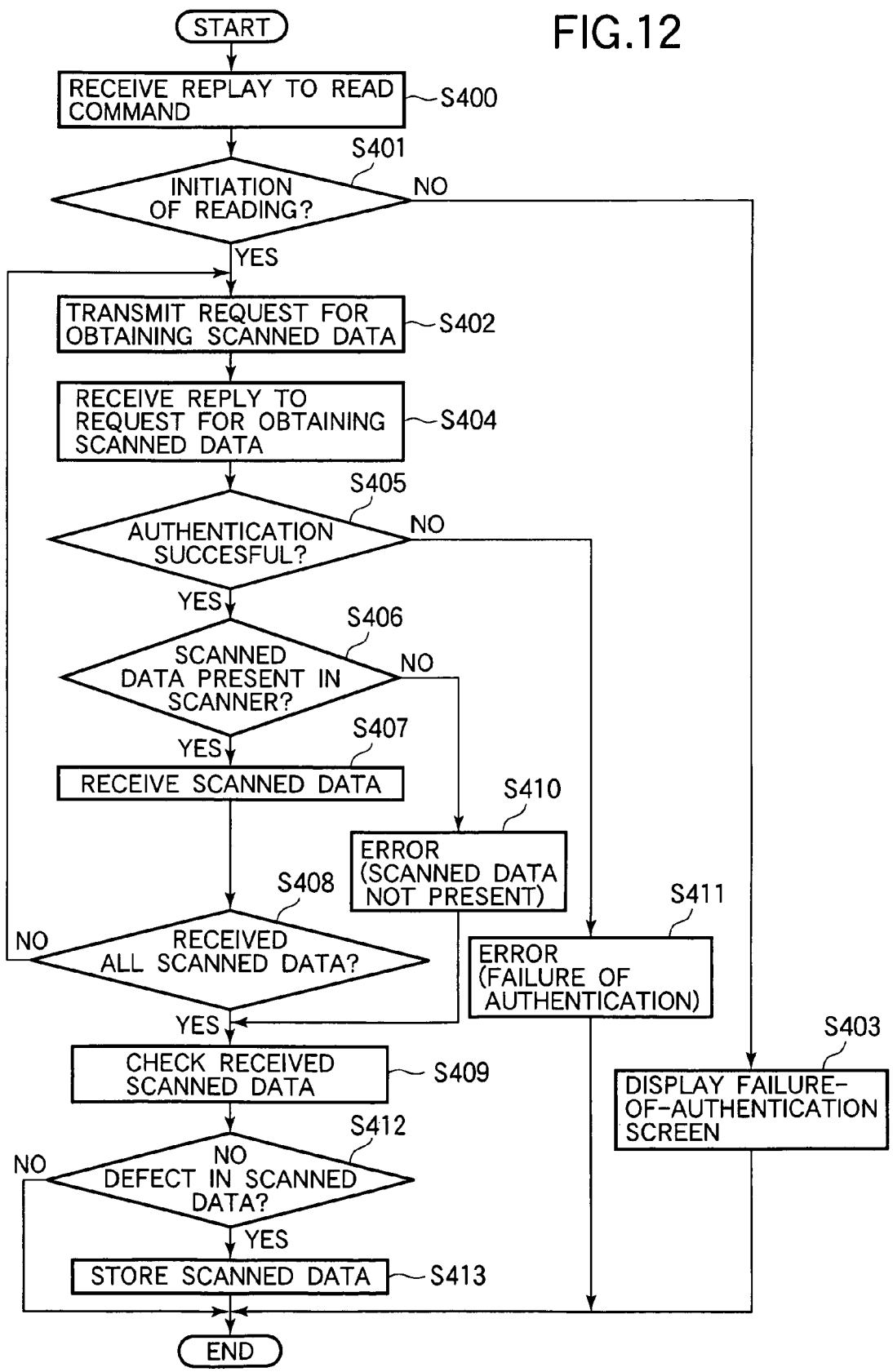
FIG. 12 is a flowchart illustrating the operation of the personal computer when the personal computer receives a reply from the network scanner.

FIG. 12 is a flowchart illustrating the operation of the PC 200 when the PC 200 receives the reply from the network scanner 100. The operation of the PC 200 will be described with reference to FIG. 12.

Upon receiving the reply from the network scanner 100 through the communication section 204 (S400), the controller 206 makes a decision to determine whether the reply is to notify the initiation of reading or failure of authentication (S401). If the reply is to notify the initiation of reading (Y at S401), a request for obtaining the scanned data is transmitted to the network scanner 100 through the communication section 204 (S402). The request contains the job identification value contained in the reply received at S400, and the identification value of the source PC that transmitted the command. If the reply indicates failure of authentication, then a "FAILURE-OF-AUTHENTICATION SCREEN" is displayed (S403).

Then, in response to the request, the communication section 204 receives the reply from the network scanner 100 (S404). In response to the read command transmitted at S404, the network scanner 100 performs authentication between the job identification value and the identification value of the source PC that transmitted the read command, as described later, and the controller 107 makes a decision to determine whether the scanned data corresponding to the job identification is present in the scanned data producing section 102. The PC 200 receives the result of authentication and the information on the presence or absence of scanned data (S404).

If the PC 200 receives the job identification value and a reply indicative of success of authentication (Y at S405), and if the scanned data corresponding to the job identification is present in the network scanner 100 (Y at S406), then the PC 200 receives the scanned data (S407). The scanned data for a single job may include data obtained by more than one scanning operation (i.e., a plurality of pages). Here, it is assumed that the PC 200 has been informed of a total amount of data for the job. If the controller 206 determines that the scanned obtained by a single scanning is sufficient for the job (Y at S408), the obtained data is checked to determine whether the obtained data is not defective as, for example, PDF or JPEG (S409). If the controller 206 is unable to determine that the scanned data obtained by a single scanning operation is sufficient (N at S408) or the scanned data obtained by a single scanning operation is not sufficient, the program jumps back to S402 where the request for obtaining scanned data is again transmitted to the network scanner 100.

If the authentication was successful between the job identification value contained in the request and the identification value of the source PC that transmitted the command (Y at S405), and if the scanned data corresponding to the job identification is not present in the network scanner 100 (N at S406), it follows that there is not scanned data corresponding to the job specified by the request (S410), in which case, the request is terminated and then the scanned data that has been obtained previously is checked to determine whether the obtained data is not defective as, for example, PDF or JPEG (S409).

If it is determined at S405 that the job identification value contained in the request and the identification value of the PC that transmitted the command do not coincide, the authentication fails (S411), and the program ends. If it is determined that no defect was found in the scanned data (Y at S412), the scanned data is stored in the scanned image memory 205 (S413) If the scanned data is defective (N at S412), then the scanned data that has been received previously is discarded and then the program ends.

Figure 13:
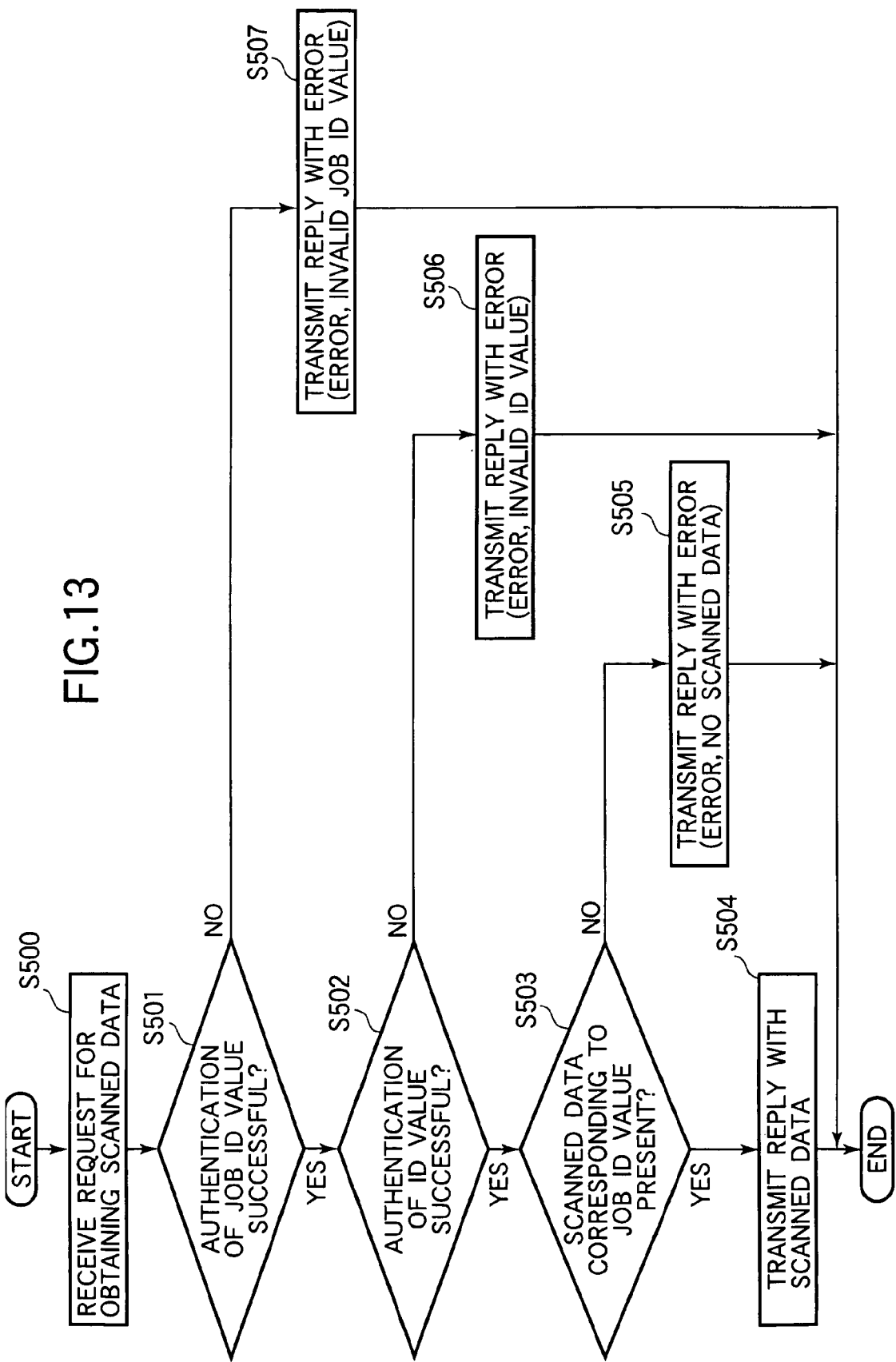
FIG. 13 is a flowchart illustrating the operation of the network scanner when the network scanner receives a request for obtaining scanned data.

FIG. 13 is a flowchart illustrating the operation of the network scanner 100 when the network scanner 100 receives a request for obtaining scanned data from the PC. The operation of the network scanner 100 will be described with reference to FIG. 13.

The communication section 105 receives the request from the PC 200 (S500). Then, authentication is performed between the job identification value contained in the request and the job identification value stored in the job information storing section 106 (S501).

If the two job identification values coincide, then authentication is performed to determine whether the identification value, contained in the request, of the source PC that has transmitted the read command, and the job identification value stored in the job information storing section 106 (corresponds to the job identification checked at S501) coincide (S502). If YES at S502, then a check is made to determine whether the scanned data corresponding to the job identification value contained in the request has been produced by the scanned data producing section 102 and is now present (S503) If the scanned data produced by the scanned data producing section 102 is actually present (Y at S503), the scanned data is transmitted to the PC in response to the request (S504).

If the corresponding scanned data does not exist (N at S503), an "ERROR" indicating that no scanned data exists is transmitted in response to the request (S505). If the identification value of the source PC that transmitted the read command is invalid at S502, then an "ERROR" indicative that the identification value of the source PC that transmitted the read command is transmitted in response to the request (S506). If the job identification value is invalid at S501, then an "ERROR" indicative that the job identification value is invalid is transmitted in response to the request (S507).

As described above, if the authentication information is inputted prior to the placing of the original document, the network scanner 100 enters the user log-in mode. Then, authentication is performed to determine whether the read command is transmitted from the user who actually placed the original document on the original document reading section 101. If the read command is transmitted from a user who did not actually place the original document, then the image of the original document is not read, thereby preventing the image data of the original document from being stolen by someone who transmits a read command after the authorized user has placed the original document on the original document reading section 101.

Second Embodiment

Figure 14:
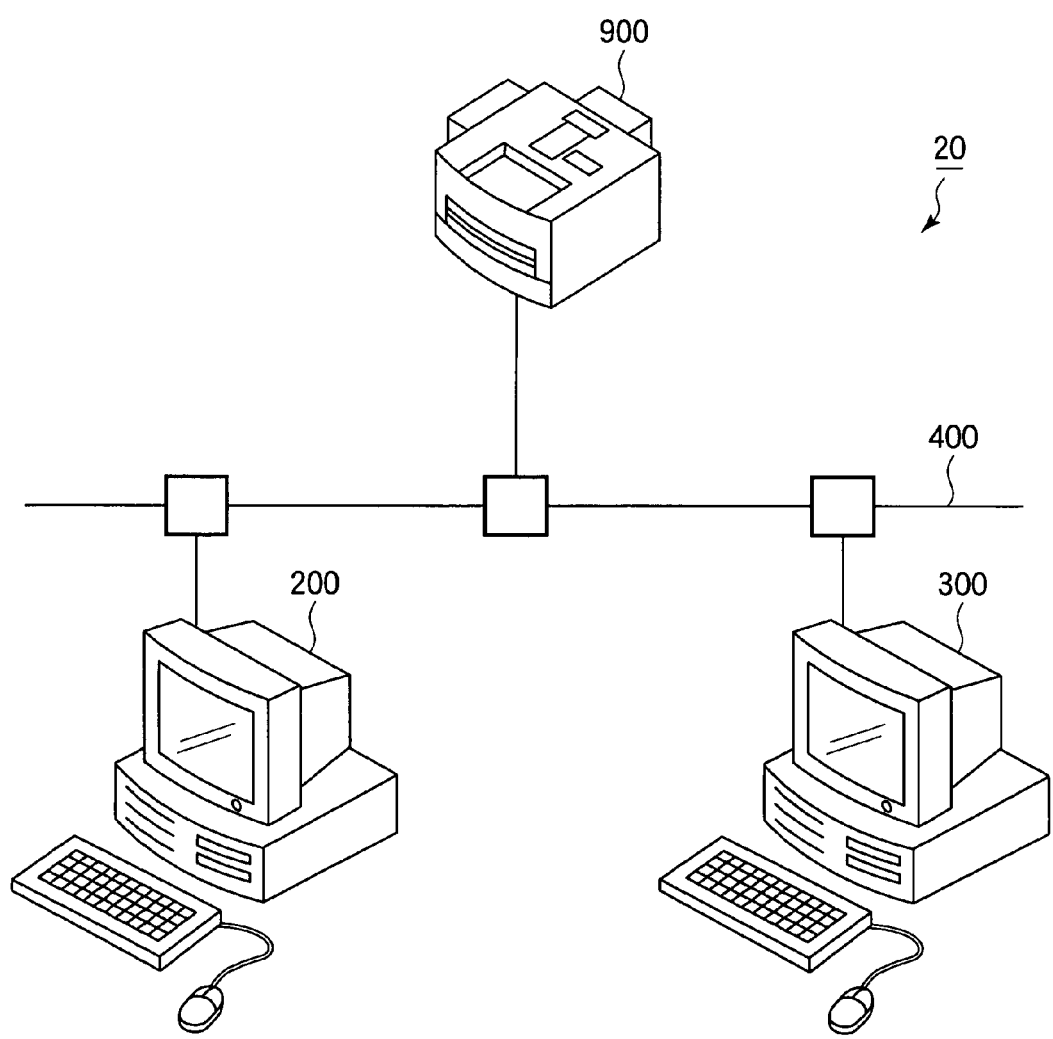
FIG. 14 illustrates an image reading system of a second embodiment.

FIG. 14 illustrates an image reading system 20 of a second embodiment. Referring to FIG. 14, the image reading system 20 includes a network scanner 900 connected to personal computers (PCs) 200 and 300 through a LAN 400. The network scanner 900 communicates with the PCs 200 and 300 using TCP/IP protocol. The number of PCs that transmit a read command to read the image of an original document may be more than b 2.

Figure 15:
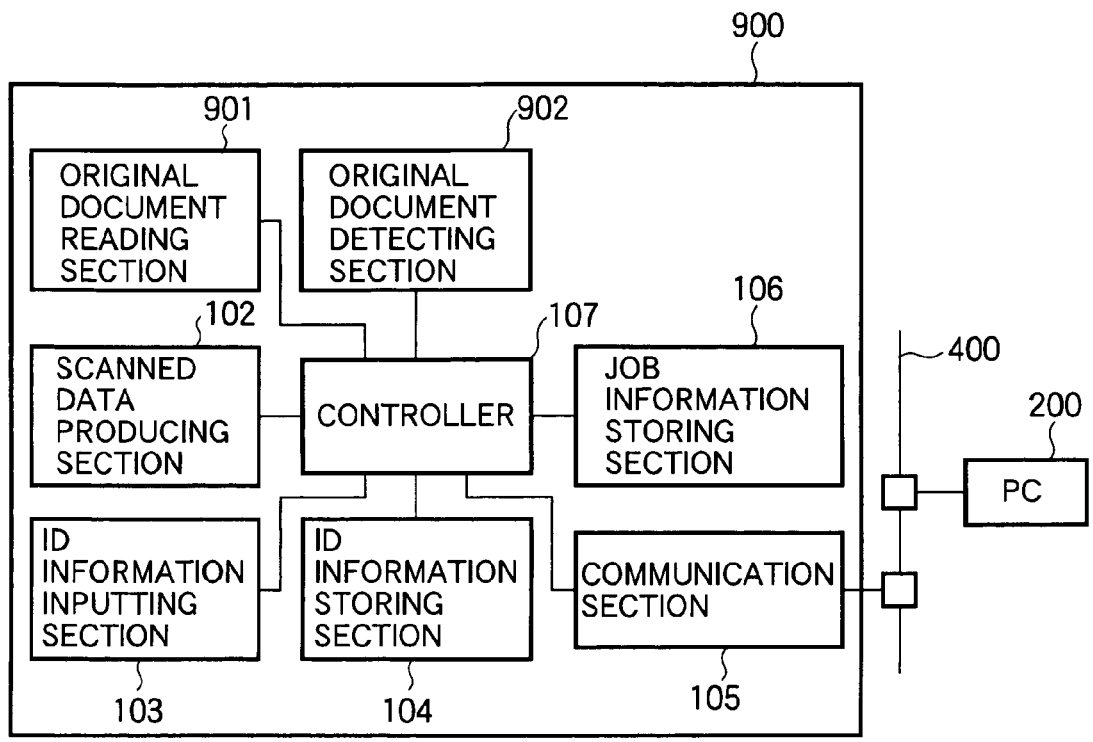
FIG. 15 is a block diagram illustrating the network scanner of the second embodiment.

FIG. 15 is a block diagram illustrating the network scanner 900. Referring to FIG. 15, the network scanner 900 includes an original document reading section 901, a scanned data producing section 102, an ID information inputting section 103, an ID information storing section 104, a communication section 105, a job information storing section 106, a controller 107, and an original document detecting section 902.

Figure 16:
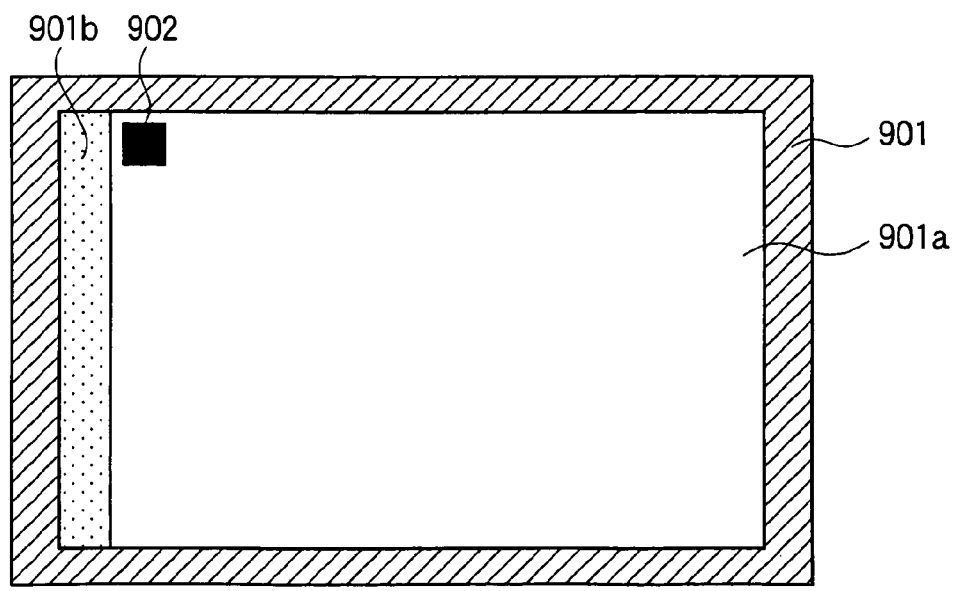
FIG. 16 is a top view of an original document reading section and a original document detecting section.

The original document reading section 901 of the second embodiment takes the form of a flatbed type reader, and reads the image of an original document placed on the original document reading section 901 in position. For flatbed type readers, an original document is stationary on a flatbed, i.e., the original document still remains where it was placed, after the image of the original document has been read. Thus, the image of the original document may be read many times without the need for feeding the original document into the image reader for each reading operation. The original document detecting section 902 detects whether the original document has been placed on or removed from the image reading section 901. FIG. 16 is a top view of the original document reading section 901 and the original document detecting section 902.

Referring to FIG. 16, the original document reading section 901 includes a glass plate 901a and a reader 901b. The original document is placed face down on the glass plate 901a. The reader 901b includes a light surface and an optical sensor, and reads a thin line of image. Upon initiation of scanning, the reader 901b runs at a constant speed under the glass plate 901a to read the entire image of the original document.

The original document detecting section 902 is disposed under the glass plate 901a. The original document detecting section 902 is disposed in the vicinity of a reference position where an upper left corner of the original document is positioned. The original document detecting section 902 takes the form of a reflection type sensor that includes a light emitting element (e.g., LED) and a light receiving element (e.g., photoelectric element). The light emitted from the light emitting element is reflected by the original document placed on the glass plate 901a, and is received by the light receiving element. The original document detecting section 902 is disposed at a height where the reader 901b runs above the original document detecting section 902. The remaining portions of the network scanner 900 are the same as those of the first embodiment, and therefore have been given the same or similar reference numerals, and their description is omitted.

Figure 17:
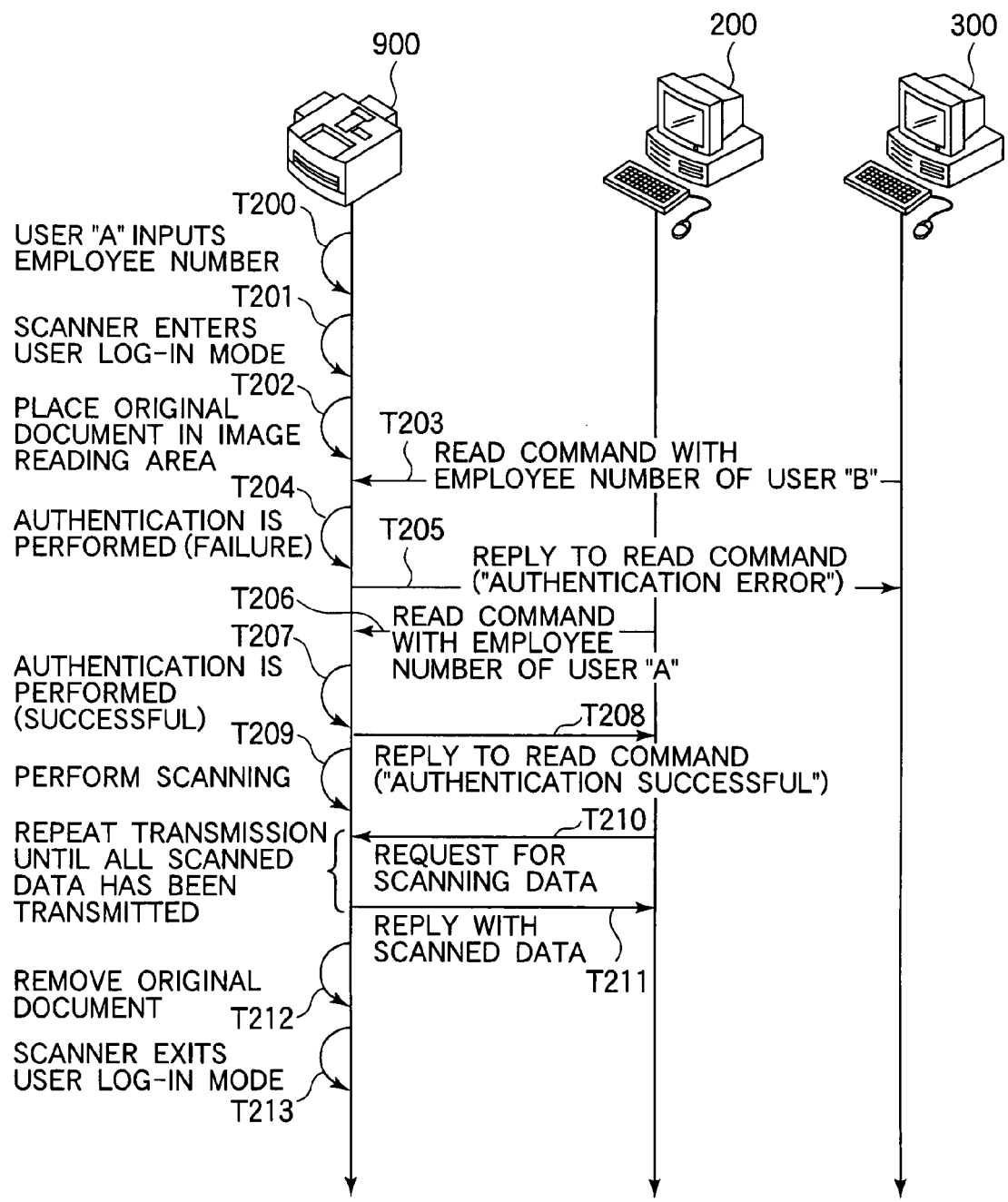
FIG. 17 illustrates the sequence of the overall operation of the second embodiment.

The operation of the second embodiment will be described. In the first embodiment, the network scanner 100 exits the user log-in mode immediately after the reading operation is completed. In the second embodiment, a reading operation is performed after an original document is placed at the image reading position, then the original document is removed from the image reading position, and finally the network scanner 900 exits the user log-in mode. FIG. 17 illustrates the sequence of the overall operation of the second embodiment. The operation will be described with reference to FIG. 17.

Before the original document is placed on the network scanner 900, the user (e.g., USER A) inputs his employee number or authentication information through the ID information inputting section 103 using his IC card (T200). Upon receiving the employee number, the network scanner 900 enters the user log-in mode (T201). Then, the user places an original document to be read on the original document reading section 901 (T202).

When the network scanner 900 is in the user log-in mode, if, for example, another user (e.g., USER B) transmits a read command from the PC 300 to the network scanner 900 through the communication section (T203), the network scanner 900 performs authentication to determine that the PC that transmitted the read command is not an authorized one (T204). Then, the network scanner 900 transmits a reply indicative of failure of authentication to the PC 300 through the communication section 105 (T205).

Upon receiving the employee number of the authorized user (USER A) and the read command (T206), the network scanner 900 performs authentication (T207). The reply indicates success of authentication to the PC 200 through the communication section 105 (T208).

Then, the original document reading section 901 of the network scanner 900 reads the image of the original document (T209). Upon receiving a request for obtaining scanned data (T210), the network scanner 900 performs authentication and then transmits the scanned data in response to the request (T211). This operation is repeated until all the scanned data has been transmitted. After all the scanned data has been transmitted, the user removes the original document from the glass plate 901a, then the original document detecting section 902 detects the removal of the original document (T212), and finally the network scanner 900 exits the user log-in mode (T213).

Figure 18:
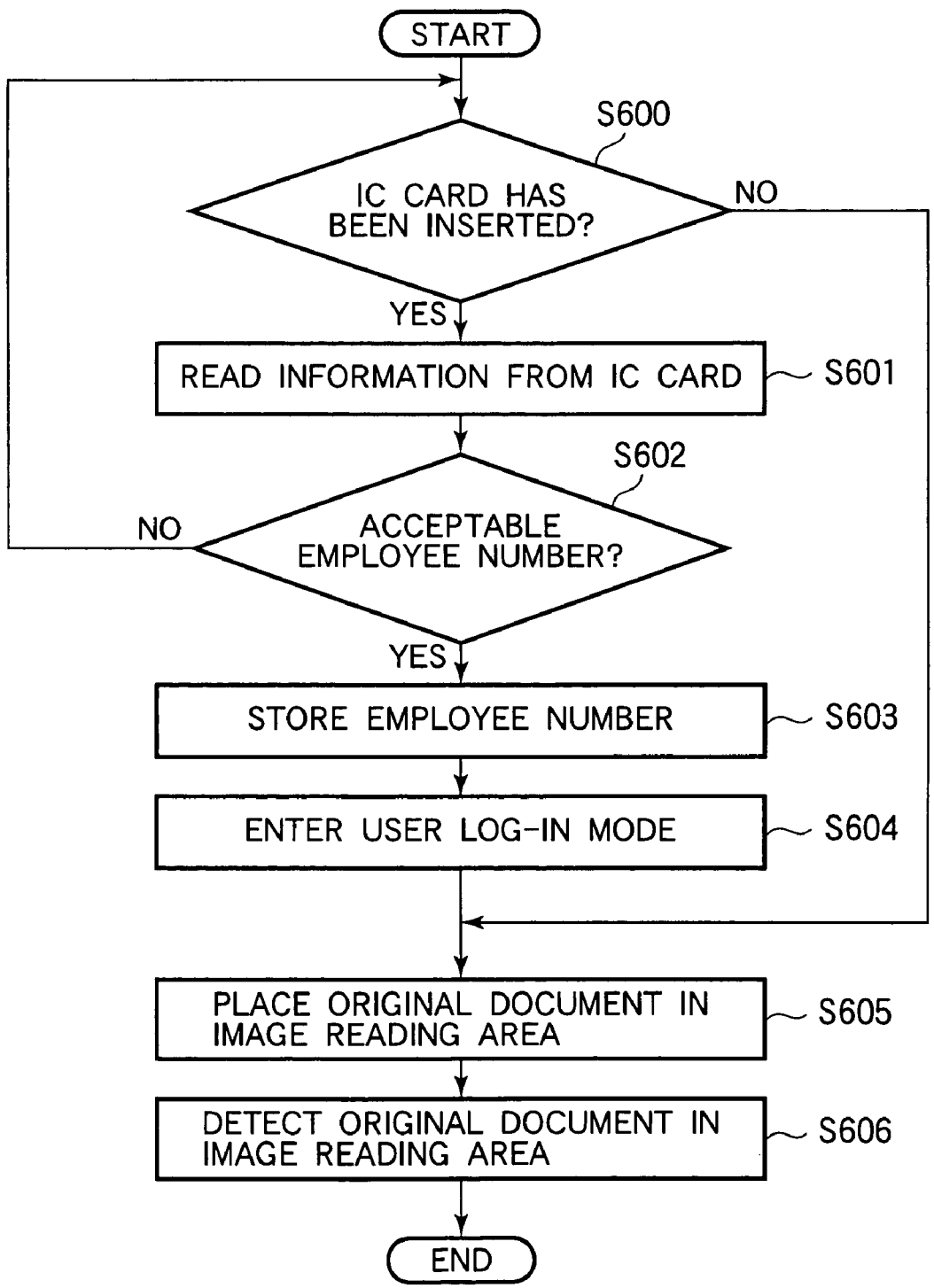
FIG. 18 is a flowchart illustrating the operation for placing the original document on the network scanner.

FIG. 18 is a flowchart illustrating the operation for placing the original document on the network scanner 900. The operation will be described with reference to FIG. 18.

Assume that the network scanner 900 is in the user log-in mode. The user inserts his IC card into the IC card reader or an ID information inputting section 103 (S600), thereby inputting authentication information. If the original document is not classified, the user is not required to input the authentication information. The controller 107 executes the process for reading the authentication information from the IC card inserted into the ID information inputting section 103 (S601).

If an authorized employee number of the user is contained in the IC card (S602), the employee number is stored into the ID information storing section 104 (S603). The controller 107 controls the network scanner 900 to enter the user log-in mode (S604). If it is determined at S602 that the IC card does not hold the acceptable employee number, the program jumps back to S600 where an IC card is inserted into the ID information inputting section 103. After the network scanner 900 has entered the user log-in mode, the image of an original document is read only when the employee number received from a PC and the employee number stored in the ID information storing section 104 coincide, which will be described later.

Then, the user A places the original document on the original document reading section 103 (S605). The original document detecting section 902 detects the original document placed on the original document reading section 901 (S606). This completes the operation.

When the PC 200 transmits a read command, the PC 200 operates in the same way as the first embodiment.

Figure 19:
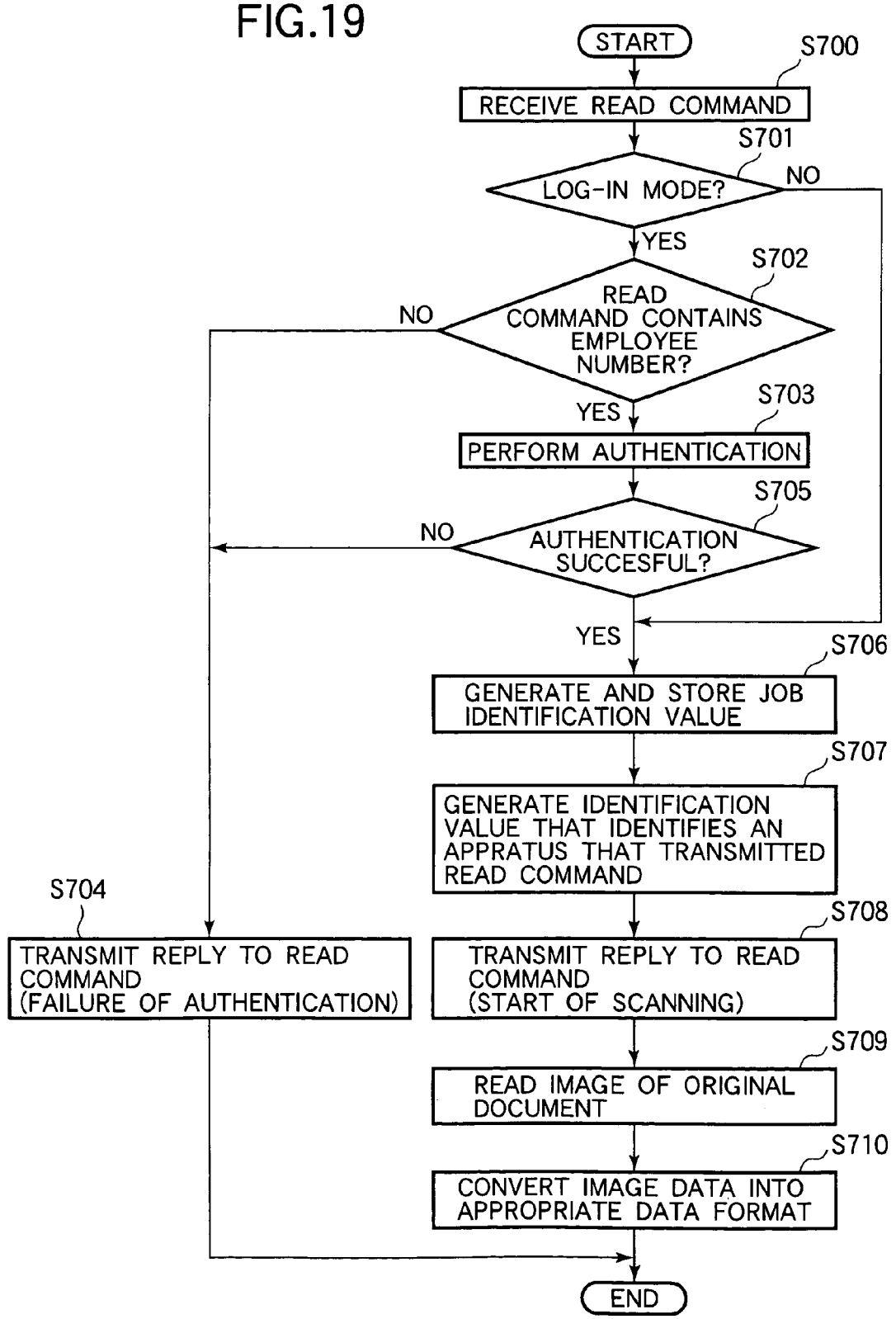
FIG. 19 is a flowchart illustrating the operation of the network scanner when the network scanner receives the read command.

FIG. 19 is a flowchart illustrating the operation of the network scanner 900 when the network scanner 900 receives the read command. The operation will be described with reference to FIG. 19.

The communication section 105 receives the read command, from, for example, the PC 200 (S700). The controller 107 checks whether the network scanner 900 is in the user log-in mode (S701) If the network scanner is in the user log-in mode, the controller 107 makes a decision to determine whether the read command contains an employee number (S702).

If the read command contains an employee number, the controller 107 performs authentication (S703). The controller performs authentication by comparing the employee number contained in the read command with an employee number stored into the ID information section 104. If the employee numbers coincide, the authentication is successful (Y at S705). If the employee numbers do not coincide, the authentication fails (N at S705).

If it is determined at S702 that the read command does not contain an employee number (N at S702), the network scanner 900 transmits a reply indicative of "AUTHENTICATION ERROR" through the communication section 105 (S704). If the authentication fails at S703 (N at S705), the network scanner 900 transmits a reply indicative of "AUTHENTICATION ERROR" through the communication section 100 (S704).

If the authentication is successful (Y at S705), a job identification value is generated within the network scanner 900, corresponding to the read command received at S700 (S706). Another identification value is generated corresponding to the source PC (here, PC 200) that transmitted the read command. The job identification value and the corresponding identification value of the source PC are stored in tabular form in the job information storing section 106 (S707).

Then, the network scanner 900 transmits a reply to the read command through the communication section 105, the reply notifying initiation of a reading operation (S708). The reply contains the job identification value generated at S706 and the identification value of the source PC that transmitted the read command generated at S707. Then, the original document reading section 901 reads the image of the original document (S709). Upon completion of reading the image, the data read by the original document reading section 901 is converted in the scanned data producing section 102 with the network scanner remaining in the user log-in mode (S710). As described above, in the second embodiment, the network scanner 900 still remains in the user log-in mode shortly after the image of the original document has been read.

When the PC 200 receives the reply to the read command, the PC 200 operates in the same way as the first embodiment shown in FIG. 2 of the first embodiment. Also, when the network scanner 900 receives the request for obtaining the scanned data, the network scanner 900 operates in the same way as the first embodiment shown in FIG. 13.

Figure 20:
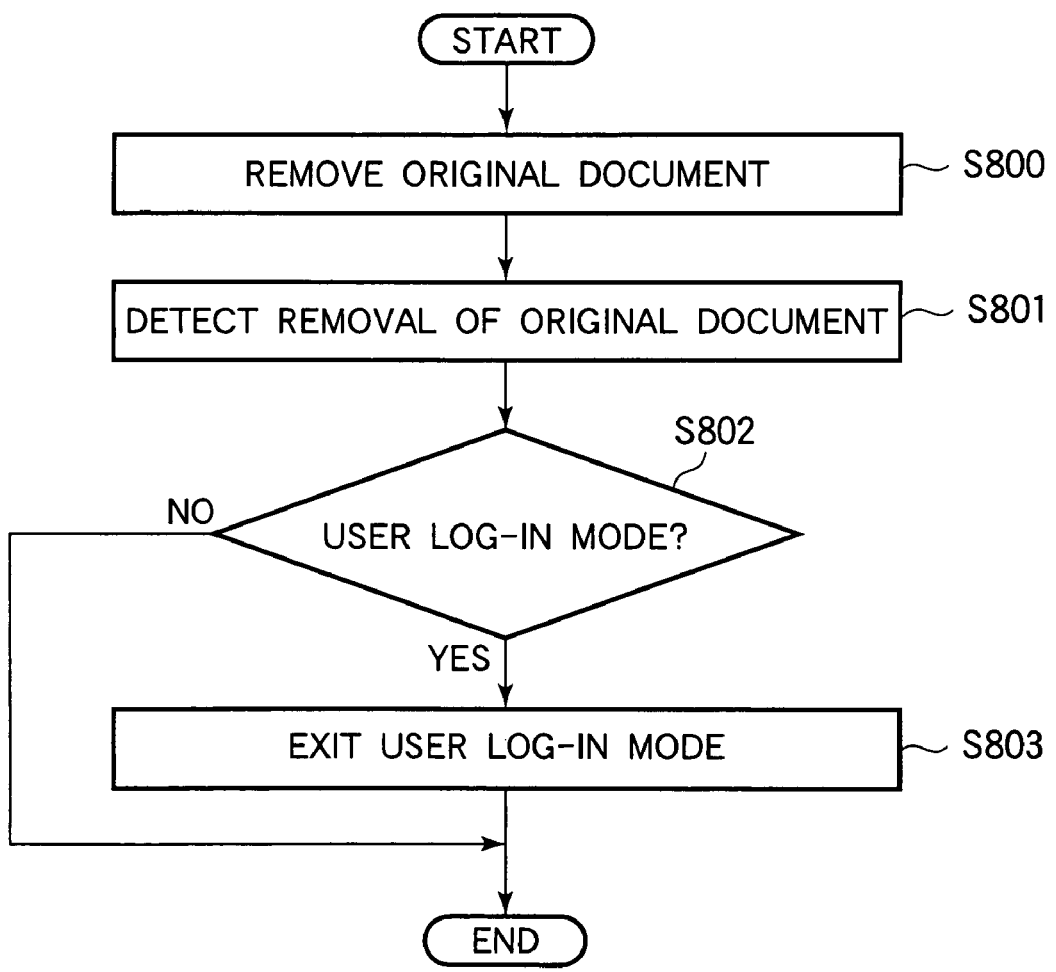
FIG. 20 is a flowchart illustrating the operation of the network scanner when the user removes the original document from the original document reading section.

FIG. 20 is a flowchart illustrating the operation of the network scanner 900 when the user removes the original document from the original document reading section 901.

The operation of the network scanner 900 will be described with reference to FIG. 20. Assume that the original document has been placed on the original document reading section 901 in position and the original document detecting section 902 has detected the placement of the original document.

When the user removes the original document from the original document reading section 901 (S800), the original document detecting section detects that the original document has been removed (S801). If the network scanner 900 is in the user log-in mode (Y at S802), the network scanner exits the user log-in mode (S803). If the network scanner 900 is not in the user log-in mode (N at S802), the program ends.

As described above, the network scanner 900 of the second embodiment remains in the user log-in mode until the original document has been removed by the user. Thus, the second embodiment provides the following advantages in addition to those of the first embodiment. There is not possibility of the image information of an original document being stolen after the authenticated user has obtained the scanned image of the original document, which would otherwise be the case if the original document reading section 901 is of a flatbed type so that the original document remains where it is after the original document reading section 901 has read the image of the document.

The invention being thus described, it will be obvious that the same may be varied in many ways. Such variations are not to be regarded as a departure from the scope of the invention, and all such modifications as would be obvious to one skilled in the art intended to be included within the scope of the following claims.

What is claimed is:

1. An image reading apparatus comprising:
   an original document reading section that scans an original document to read the image of an original document, original document being placed on said original document reading section;
   a scanned data producing section that produces scanned data based on the image read by said original document reading section;
   a communication section that communicates with an external apparatus, said communication section receiving a read command from the external apparatus, the read command containing a first item of identification information and a command to read the image from the original document, said communication section transmitting scanned data produced in said scanned data producing section to the external apparatus;
   an inputting section through which a user inputs a second item of identification information;
   a controller that controls said original document reading section to scan the original document in response to the read command;
   wherein if the first item of identification information and the second item of identification information coincide, said controller allows said original document reading section to scan the original document.

2. The image reading apparatus according to claim 1, further comprising a memory section that stores the first item of identification information and a third item of identification information corresponding to the first item of identification information, the first item of identification information and the third item of identification information being stored in tabular form;
   wherein said controller compares the second item of identification information with the third item of identification information to determine whether the second item of identification information and the third item of identification information coincide;
   wherein if the second item of identification information and the third item of identification information coincide, then the controller determines that the first item of identification information and the second item of identification information coincide, and allows said original document reading section to scan the original document.

3. The image reading apparatus according to claim 1, further comprising an original document detecting section that detects the presence or absence of the original document in the image reading area on said original document reading section;
    wherein when said original document detecting section detects the presence of the original document in the image reading area, said controller makes a decision to determine whether the first identification information and the second item of identification information coincide;
    wherein if the first identification information and the second item of identification information coincide, then said controller allows said original document reading section to scan the original document.

4. An image reading apparatus that includes an original document reading section that scans an original document to read the image of an original document in response to a read command, and that is connected to an external apparatus that transmits the read command via a network to the image reading apparatus, the image reading apparatus comprising:
    an inputting section through which a user inputs his authentication information;
    a memory that stores the authentication information inputted through said inputting section;
    a status setting section that causes the image reading apparatus to enter a user log-in mode when the user inputs his authentication information through said inputting section; and
    a decision section that makes a decision based on the authentication information stored in the memory and the information received from the external apparatus to determine whether the read command should be executed, the decision being made after the image reading apparatus has entered the user log-in mode.

5. The image reading apparatus according to claim 4, wherein when said decision section determines that the read command should be executed, said original document reading section scans the original document to read the image of the original, and said status setting section causes the image reading apparatus to exit the user log-in mode after the original document reading section has read the image of the original document.

6. The image reading apparatus according to claim 4, further comprising a detecting section that detects whether the original document is present in an image reading area on the original document reading section;
    wherein if said detecting section detects removal of the original document from the image reading area after the original document reading section has read the image of the original document, then said status setting section causes the image reading apparatus to exit the user log-in mode.

7. A method for an original reading section to read the image of an original document placed on an image reading apparatus in response to a read command received from an external apparatus, the method comprising:
    inputting authentication information on a user;
    storing the inputted authentication information;
    entering a user log-in mode upon receiving the authentication information; and
    making a decision to determine whether the image of the original document should be read, the decision being made based on the stored authentication information and information received form the external apparatus.

8. The method according to claim 7, further comprising:
    exiting the user log-in mode upon removal of the original document from the image reading section after the image of the original document has been read.

9. The method according to claim 7 further comprising detecting whether the original document has been placed in an image reading area on the image reading apparatus; and
    exiting the user log-in mode upon detection of removal of the original document from the image reading area after the image of the original document has been read.

\* \* \* \* \*